United States Patent [19]

Falls et al.

[11] Patent Number: 4,570,711

[45] Date of Patent: Feb. 18, 1986

[54] PROCESS FOR OPTIMIZING THE NONCONDENSIBLE GAS CONTENT OF AN OIL-DISPLACING STEAM-FOAM-FORMING MIXTURE

[75] Inventors: Andrew H. Falls, Sugarland; Jimmie B. Lawson; George J. Hirasaki, both of Houston, all of Tex.

[73] Assignee: Shell Oil Company, Houston, Tex.

[21] Appl. No.: 639,157

[22] Filed: Aug. 9, 1984

[51] Int. Cl.$^4$ ............................................. E21B 43/24
[52] U.S. Cl. ..................................... 166/272; 166/303; 166/252
[58] Field of Search ................. 166/272, 252, 303, 250

[56] References Cited

U.S. PATENT DOCUMENTS

| | | | |
|---|---|---|---|
| 3,707,193 | 12/1972 | Smith et al. | 166/303 |
| 4,086,964 | 5/1978 | Dilgren et al. | 166/272 |
| 4,161,217 | 7/1979 | Dilgren et al. | 166/272 |
| 4,488,598 | 12/1984 | Duerksen | 166/252 |

Primary Examiner—Stephen J. Novosad
Assistant Examiner—Bruce M. Kisliuk

[57] ABSTRACT

In a process for injecting a steam-foam-forming mixture into a subterranean reservoir to displace oil, injecting a mixture containing only as much noncondensible gas as required for substantially reducing the mobility of an injected steam-foam-forming mixture containing a given kind and amount of surfactant and electrolyte, which amount of noncondensible gas to add is calculated from a specified equation interrelating the reservoir temperature and pore size.

7 Claims, 1 Drawing Figure

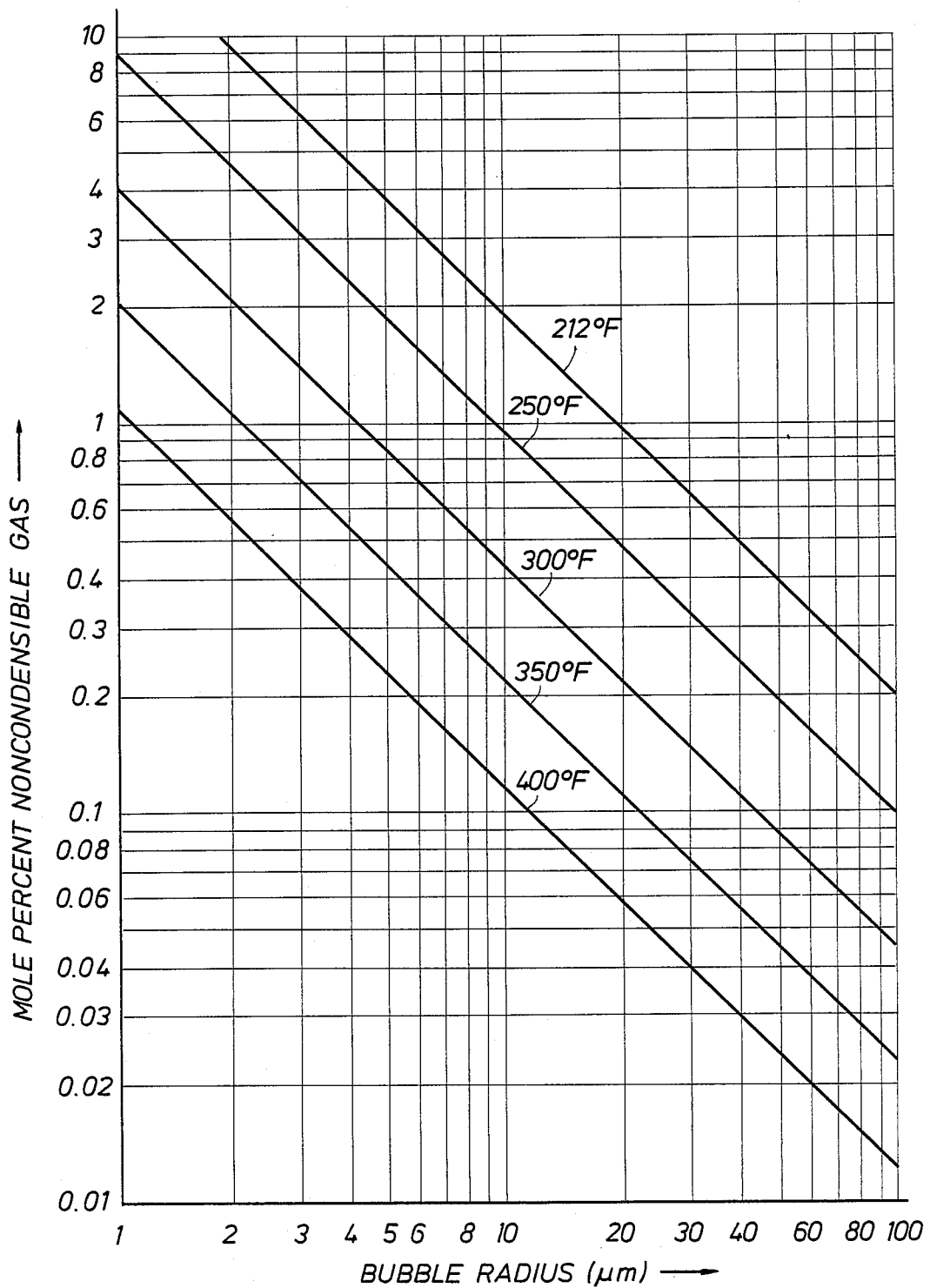

PROCESS FOR OPTIMIZING THE NONCONDENSIBLE GAS CONTENT OF AN OIL-DISPLACING STEAM-FOAM-FORMING MIXTURE

BACKGROUND OF THE INVENTION

This invention relates to injecting a steam-foam-forming mixture into a subterranean reservoir to displace oil. More particularly, the invention relates to improving such an oil displacement by using a mixture containing only as much noncondensible gas as required to reduce substantially the mobility of a steam-foam-forming mixture containing a given kind and amount of surfactant and electrolyte.

Steam-foam-forming mixtures have been described in a number of patents. For example, U.S. Pat. No. 3,707,193 by T. K. Smith, Y. C. Chiu and J. B. Lawson, describes a well cleaning process involving injecting a steam-foam-forming mixture of wet steam, noncondensible gas, surfactant and electrolyte. U.S. Pat. No. 4,086,964 by R. E. Dilgren, G. J. Hirasaki, D. G. Whitten and H. J. Hill, describes a steam drive oil recovery process involving injecting a steam-foam-forming mixture of wet steam, noncondensible gas, surfactant and electrolyte. U.S. Pat. No. 4,161,217 by R. E. Dilgren and K. B. Owens describes a similar process involving injecting both the steam-foam-forming mixture and a hot water and noncondensible gas foam which tends to underride such a steam-containing mixture. U.S. Pat. No. 4,393,937 by R. E. Dilgren and K. B. Owens describes a process for displacing oil by injecting a steam-foam-forming mixture of wet steam, noncondensible gas, electrolyte and an alpha-olefin surfactant. Commonly assigned copending patent application Ser. No. 530,156 filed Sept. 7, 1983 by P. B. Ritter and R. E. Dilgren describes a steam soak oil recovery process involving injecting a steam-foam-forming mixture of wet steam, noncondensible gas, electrolyte and a surfactant that forms a foam which is more mobile in reservoir pores which contain oil than in those which do not.

Thus, it is known, from descriptions such as those identified above, that, in a steam-foam-forming mixture capable of forming a foam or mixture of steam, gas and water which is significantly less mobile than steam alone, the presence of at least some noncondensible gas is desirable. However, the noncondensible gas component of such a mixture is a relatively expensive ingredient that tends to increase the cost of using such a mixture. And, it was not previously known how to determine how much noncondensible gas was required for a given reservoir situation. It was known to be desirable to avoid using more of the noncondensible gas than necessary, but field test results indicated that, at least in some reservoirs, some noncondensible gas was essential. Moreover, it was found that the amount of noncondensible gas required was apt to be too small to be reliably measured by means of laboratory testing.

In view of this, the present invention is, at least in part, premised on a discovery that relatively reliable estimates of the amount of noncondensible gas which is actually needed in a particular reservoir situation can be made by relatively simple calculations which are based on reservoir properties that can be measured or determined by conventional procedures.

SUMMARY OF THE INVENTION

The present invention relates to a process in which a mixture of noncondensible gas, wet steam and at least one surfactant which is or becomes dissolved or dispersed in the liquid phase of the wet steam, is injected into a subterranean reservoir in order to reduce the mobility of the injected steam-containing fluid relative to the mobility of steam alone. The invention provides an estimate of the minimum amount of noncondensible gas needed for reducing the mobility of a steam-foam-forming mixture containing a given amount and kind of surfactant, or surfactant plus electrolyte, by including within the injected fluid a proportion of noncondensible gas which provides a solution to the gas proportioning equation:

$$y_2^g(r) = \frac{1}{1 + \frac{3rp_1^g(r)}{2\sigma}}$$

where $y_2^g(r)$ is the mole fraction of noncondensible gas in the vapor phase of the injected steam for a bubble of radius r;

r is the radius of a steam bubble equaling the pore radius of the portion of the reservoir being contacted by the injected fluid;

$p_1^g(r)$ is the partial pressure of steam in a bubble of radius r, which is very closely approximated by the vapor pressure of steam at the temperature of the heated zone;

$\sigma$ is the interfacial tension between the vapor and liquid phases of the steam.

BRIEF DESCRIPTION OF THE DRAWINGS

The drawing shows, for several temperatures, the smallest mole fraction of noncondensible gas which stabilizes a steam foam bubble having a specified radius.

DESCRIPTION OF THE INVENTION

Applicants have discovered that in a steam-foam-forming mixture of wet steam, noncondensible gas and surfactant, the noncondensible gas suppresses the vaporization and condensation that amount to the primary means by which bubbles of pure steam are destroyed. This causes gas diffusion, a slower process, to control the rate at which bubbles can grow or shrink. In order for a bubble of a specified radius to be stable to evaporation or condensation, the bubble must contain more than a minimum amount of noncondensible gas; bubbles of pure steam are unconditionally unstable. Applicants found that, by means of the above equation, combinations of reservoir properties and the minimum amount of noncondensible gas required to stabilize a steam foam can be calculated as a function of the temperature and size of the bubbles.

In a given reservoir situation the size of the average reservoir pores which are to be encountered by the injected steam-foam-forming mixture is an estimate of the size of the foam bubbles which should be stabilized. The temperature at which such bubbles should be stable is the temperature existing in the treated portion of the reservoir, which temperature is readily obtainable by measurement.

In a steam-foam-forming mixture within the pores of a reservoir, a steam foam bubble is stable to evaporation and condensation provided it contains more than a minimum amount of noncondensible gas. Such a bubble responds to any disturbance in its radius in a manner which preserves mechanical equilibrium, the temperature, liquid-phase pressure, and number of moles of noncondensible gas remaining fixed. If the partial pressure of water inside a bubble rises above its equilibrium value when an external disturbance causes the radius to increase slightly, steam begins to condense, thereby restoring the bubble to its original size. By contrast, if the partial pressure of water drops below its equilibrium level when the bubble radius decreases, water evaporates at the bubble surface and again returns the bubble to its initial state. Therefore, the criterion for an equilibrium bubble to be stable to evaporation and condensation is that the change in partial pressure of component 1, water, with radius at fixed temperature, liquid-phase pressure, and number of moles of component 2, noncondensible gas, must be strictly positive for a state to be locally stable. In terms of the mole fraction of noncondensible gas in the vapor phase, this stability condition becomes $$y_2^g(r) > \frac{1}{1 + \frac{3rp_1^g(r)}{2\sigma}}$$

In an oil reservoir, the average bubble radius of curvature will be of the order of the average reservoir pore size. If the average pore radius is taken as the radius of steam foam bubbles that should be stabilized, the FIGURE can be used to estimate the amount of noncondensible gas that needs to be added to a steam foam formulation.

The FIGURE displays for several temperatures the smallest mole fraction of noncondensible gas that stabilizes a bubble of a specified radius. That is, it shows the solution to the gas proportioning equation:

$$y_2^g(r) = \frac{1}{1 + \frac{3rp_1^g(r)}{2\sigma}}$$

In constructing the FIGURE, the interfacial tension between the vapor and liquid phases was taken as 30 dyne/cm $p_1^g(r)$ as the vapor pressure of pore water.

Based on such an estimate, a steam foam formulated for an oil reservoir with a temperature of 250° F. and an average pore radius of 10 $\mu$m should contain about 1 mole percent noncondensible gas. The amount needed decreases as either the temperature or average pore size increases. In a 400° reservoir that has 100 $\mu$m pores, only about 0.01 mole percent noncondensible gas is needed in the vapor phase.

These estimates compare well with the amount of noncondensible gas actually added in field operations. The foam successfully employed at a steam foam pilot on the Mecca Lease in Kern River contained 0.6 mole percent nitrogen. There the average pore radius of the "good M sand" as determined from mercury injection capillary pressure data was about 20 $\mu$m and the steam zone temperature was between 240°–250° F.

The FIGURE gives the smallest amount of noncondensible gas that should suppress evaporation and condensation in steam foams under isothermal conditions. The sizes of steam foam bubbles in an oil reservoir are still affected by heat losses to reservoir rock and by molecular diffusion of noncondensible gas—any gas is to some extent soluble in water. Mass transfer due to diffusion, however, is much slower than transfer due to evaporation and condensation so that the stability of steam foam bubbles is increased significantly by noncondensible gas.

As known to those skilled in the art, the average pore size of a portion of a subterranean reservoir which is being treated, or is to be treated, can readily be measured or determined by currently known procedures. Such procedures can include well logs, core analyses, measurements of flow rates within the reservoirs in response to known injection pressures and/or drawdowns within production wells, or the like.

As indicated in the above mentioned patents and patent application—the disclosures of which are incorporated herein by reference—the steam-foam-forming mixtures can contain rather widely varied kinds and amounts of components. The noncondensible gas can be substantially any which undergoes little or no condensation at the temperature and pressure of the steam-containing fluid being injected into the reservoir. The steam is preferably a relatively wet steam in which there is a significant proportion of aqueous liquid phase, such as a steam having a steam quality in the order of from about 10 to 90 percent. The surfactant used can be substantially any which is capable of being substantially dissolved and/or dispersed within the liquid phase of the steam and is capable of forming a steam foam of a relatively low mobility in contact with the oil in the reservoir to be treated at the temperature of the treatment. In general, it is desirable that the steam-foam-forming mixture contain enough aqueous electrolyte to enhance the foam-forming action of the surfactant, with the electrolyte preferably being present either before and/or being added while the steam-containing fluid is injected into the reservoir. All of the components of such a steam-foam-forming fluid can be intermixed in substantially any sequence. The steam can be generated at surface or downhole locations. The electrolyte can comprise the inorganic salts of predominantly monovalent cations, such as sodium chloride and/or sodium carbonate. The oil displacing process for which the steam-foam-forming mixture is injected into the reservoir can be either a steam soak, a steam drive, or a steam soak or drive combined with an injection of hot water or hot water foam, or the like.

For use in the present process a particularly suitable noncondensible gas comprises nitrogen; preferred surfactants are those having foam-forming and adsorptivity properties at least substantially equivalent to those of sodium dodecylbenzene sulfonate with respect to forming a strong foam and undergoing relatively small and reversible amounts of adsorption on reservoir rocks; particularly preferred surfactants are alpha-olefin surfactants of similar capabilities and particularly suitable electrolytes are sodium chloride and/or sodium carbonate.

The reservoir to which the present process is applied is one in which the disposition of a steam flow is determined by the effect of gravity and/or oil distribution rather than being substantially confined to only one or a few most permeable layers. The process can comprise either a steam foam soak or steam foam drive process for displacing the reservoir oil.

What is claimed is:

1. In a process in which a mixture of noncondensible gas, wet steam, and at least one surfactant that is dissolved or dispersed in the liquid phase of the wet steam, is injected into a subterranean reservoir to reduce the mobility of the injected steam-containing fluid relative to the mobility of steam alone, an improvement for minimizing the amount of noncondensible gas needed to provide substantial mobility reduction with a steam-foam-forming mixture containing a given kind and amount of surfactant or surfactant and electrolyte comprising:

including within the injected fluid a proportion of noncondensible gas which is provided by a solution to the gas proportioning equation $$y_2{}^g(r) = \frac{1}{1 + \frac{3rp_1{}^g(r)}{2\sigma}}$$

where $y_2{}^g(r)$ is the mole fraction of noncondensible gas in the vapor phase of the injected steam for a bubble of radius r;

r is the radius of a steam bubble equaling the pore radius of the portion of the reservoir being contacted by the injected fluid;

$p_1{}^g(r)$ is the partial pressure of steam in a bubble of radius r which is very closely approximated by the vapor pressure of steam at the temperature of the heated zone; and $\sigma$ is the interfacial tension between the vapor and liquid phases of the steam.

2. The process of claim 1 in which the noncondensible gas is nitrogen, methane or flue gas.

3. The process of claim 1 in which the surfactant has foam-forming and adsorptivity properties at least substantially equivalent to those of sodium dodecylbenzene sulfonate with respect to forming a strong foam and undergoing relatively small and reversible amounts of adsorption on reservoir rocks.

4. The process of claim 3 in which the surfactant is an alpha-olefin surfactant.

5. The process of claim 1 in which the process applied is one in which the disposition of a steam flow is determined by the effect of gravity and/or oil distribution rather than being substantially confined to only one or a few most permeable layers.

6. The process of claim 5 in which the fluid is being injected in a steam foam drive process.

7. The process of claim 5 in which the fluid is being injected in a steam foam soak process.

* * * * *